(12) United States Patent
Salminen

(10) Patent No.: US 10,936,638 B2
(45) Date of Patent: Mar. 2, 2021

(54) RANDOM INDEX PATTERN MATCHING BASED EMAIL RELATIONS FINDER SYSTEM

(71) Applicant: Huawei Technologies Co., Ltd., Shenzhen (CN)

(72) Inventor: Karoliina Taru Katriina Salminen, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 15/907,756

(22) Filed: Feb. 28, 2018

(65) Prior Publication Data

US 2018/0189298 A1 Jul. 5, 2018

Related U.S. Application Data

(63) Continuation of application No. PCT/CN2016/096706, filed on Aug. 25, 2016.

(30) Foreign Application Priority Data

Sep. 3, 2015 (EP) .................................... 15183602

(51) Int. Cl.
*G06F 16/33* (2019.01)
*G06F 16/338* (2019.01)
(Continued)

(52) U.S. Cl.
CPC ........ *G06F 16/3347* (2019.01); *G06F 16/338* (2019.01); *G06F 17/16* (2013.01); *G06Q 10/107* (2013.01); *H04L 51/18* (2013.01)

(58) Field of Classification Search
CPC ............ G06F 16/24578; G06F 3/0482; G06F 16/248; G06F 16/9535; G06F 40/242;
(Continued)

(56) References Cited

U.S. PATENT DOCUMENTS

2008/0098125 A1\* 4/2008 Wang Baldonado ....................... G06Q 10/107 709/231
2009/0307213 A1\* 12/2009 Deng .................... G06F 16/285
(Continued)

FOREIGN PATENT DOCUMENTS

CN 101446959 A 6/2009
CN 101621391 A 1/2010
(Continued)

OTHER PUBLICATIONS

Machine Translation and Abstract of Chinese Publication No. CN101446959, Jun. 3, 2009, 15 pages.
(Continued)

*Primary Examiner* — Angelica Ruiz
(74) *Attorney, Agent, or Firm* — Conley Rose, P.C.

(57) ABSTRACT

An apparatus for identifying similar electronic messages includes a processor configured to detect a first electronic message, detect a set of one or more significant words in the first electronic message, compare the detected set of one or more significant words in the first electronic message to one or more sets of one or more significant words from a plurality of other electronic messages, and present at least a second electronic message from the plurality of other electronic messages that includes a set of one or more significant words that is similar to the detected set of one or more significant words in the first electronic message.

20 Claims, 7 Drawing Sheets

(51) Int. Cl.
*G06F 17/16* (2006.01)
*G06Q 10/10* (2012.01)
*H04L 12/58* (2006.01)

(58) Field of Classification Search
CPC .... G06F 16/285; G06F 3/0481; G06F 40/247; G06F 40/30; G06F 16/243; G06F 16/288; G06F 16/3347; G06F 16/93; G06F 40/216; G06F 11/3438; G06F 16/02
USPC ............. 707/600–831, 899, 999.01–999.206
See application file for complete search history.

(56) References Cited

U.S. PATENT DOCUMENTS

| | | | |
|---|---|---|---|
| 2011/0191693 | A1 | 8/2011 | Baggett et al. |
| 2012/0209847 | A1* | 8/2012 | Rangan ............... G06F 16/3347 707/737 |
| 2012/0209853 | A1* | 8/2012 | Desai .................. G06F 16/93 707/741 |
| 2012/0296891 | A1* | 11/2012 | Rangan ............... G06F 16/3347 707/722 |
| 2013/0006996 | A1* | 1/2013 | Kadarkarai ......... G06Q 10/107 707/738 |
| 2014/0046976 | A1 | 2/2014 | Zhang et al. |
| 2014/0059141 | A1 | 2/2014 | Belkin et al. |
| 2014/0359480 | A1* | 12/2014 | Vellal .................. H04L 51/12 715/752 |
| 2015/0186494 | A1* | 7/2015 | Gilad .................. G06F 16/38 707/740 |
| 2015/0188875 | A1* | 7/2015 | Sharp ................. H04M 1/72552 715/752 |
| 2015/0339573 | A1* | 11/2015 | Flinn ................... G06F 40/30 706/12 |
| 2016/0132789 | A1* | 5/2016 | Flinn ................... G06N 20/00 706/14 |

FOREIGN PATENT DOCUMENTS

| | | |
|---|---|---|
| CN | 102893278 A | 1/2013 |
| CN | 102929928 A | 2/2013 |
| CN | 103136266 A | 6/2013 |
| CN | 103176961 A | 6/2013 |
| CN | 103631840 A | 3/2014 |
| CN | 104199874 A | 12/2014 |

OTHER PUBLICATIONS

Machine Translation and Abstract of Chinese Publication No. CN102929928, Feb. 13, 2013, 22 pages.
Machine Translation and Abstract of Chinese Publication No. CN103136266, Jun. 5, 2013, 35 pages.
Machine Translation and Abstract of Chinese Publication No. CN104199874, Dec. 10, 2014, 7 pages.
Deng, L., et al., "Deep Learning: Methods and Applications," Foundations and Trends® in Signal Processing, 2014, 56 pages.
Sahlgren, M., "Tthe Word-Space Model: Using distributional analysis to represent syntagmatic and paradigmatic relations between words in high-dimensional vector spaces," Jan. 1, 2006, XP55223431, 156 pages.
Foreign Communication From A Counterpart Application, European Application No. 15183602.0, Extended European Search Report dated Nov. 16, 2015, 8 pages.
Foreign Communication From A Counterpart Application, PCT Application No. PCT/CN2016/096706, English Translation of International Search Report dated Nov. 30, 2016, 7 pages.
Foreign Communication From A Counterpart Application, PCT Application No. PCT/CN2016/096706, English Translation of Written Opinion dated Nov. 30, 2016, 5 pages.
Machine Translation and Abstract of Chinese Publication No. CN101621391, Jan. 6, 2010, 31 pages.
Machine Translation and Abstract of Chinese Publication No. CN103176961, Jun. 26, 2013, 10 pages.
Foreign Communication From A Counterpart Application, Chinese Application No. 201680023542.8, Chinese Office Action dated May 7, 2019, 5 pages.
Foreign Communication From A Counterpart Application, Chinese Application No. 201680023542.8, Chinese Search Report dated Apr. 23, 2019, 2 pages.
Jing, G., "Research on Chinese Text Clustering," Beijing: Communication University of China Press, 2012, 8 pages. With partial English translation.

* cited by examiner

300

302

RANDOM INDEX PATTERN MATCHING BASED EMAIL RELATIONS FINDER SYSTEM

CROSS-REFERENCE TO RELATED APPLICATIONS

This application is a continuation of International Application No. PCT/CN2016/096706, filed on Aug. 25, 2016, which claims priority to European Patent Application No. EP15183602.0, filed on Sep. 3, 2015. The disclosures of the aforementioned applications are hereby incorporated by reference in their entireties.

TECHNICAL FIELD

The aspects of the disclosed embodiments relate generally to electronic mail or message programs and in particular to identifying similarities between electronic messages in an electronic messaging program.

BACKGROUND

A mobile communication or computing device, such as for example, a smart phone, tablet or phablet, can include any number of applications or programs stored thereon. These applications can include one or more electronic messaging applications, such as electronic mail ("email") applications. Conventional email applications in a mobile operating system typically implement one or more of user defined filters for classifying text into folders or automatic categorization to pre-defined categories. The pre-defined categories are structured so that a machine learning algorithm can be used to classify the email belonging to one of these categories, with supervised learning.

The typical user interface (UI) for an email application does not provide for finding emails that may be related to the topic of a currently open email. Any searching for related information in the inbox of the email application is left to the user. This can be a tedious and time consuming task when there are many emails in the email inbox. It is not uncommon for an email inbox to have thousands if not tens of thousands of emails. Thus, it would be advantageous to be able to easily and automatically identify relationships between emails in an email application.

It is a problem to classify text into categories that are not pre-defined. Solutions in machine learning are generally based on pre-defined models that are created for dealing with the task in question. As an example, some email applications can place emails in categories, such as "Primary, Social, Updates and Forums" categories. However, this type of email application does not automatically find emails that are related to each other in some manner. It would be advantageous to automatically identify and categorize electronic messages, such as emails, which are related in some manner.

Therefore, there is a need for improved apparatus and methods for identifying related electronic messages.

SUMMARY

It is an object of the present disclosure to provide an apparatus and method to improve the identification of similar or related electronic messages in an electronic messaging application. This object is solved by the subject matter of the independent claims. Further advantageous modifications can be found in the dependent claims.

According to a first aspect of the present disclosure, the above and further objects and advantages are obtained by an apparatus for identifying similar electronic messages. The apparatus includes a processor configured to detect a first electronic message, detect a set of one or more significant words in the first electronic message, compare the detected set of one or more significant words in the first electronic message to one or more sets of significant words from a plurality of other electronic messages and present at least a second electronic message from the plurality of other electronic messages that includes a set of one or more significant words that is similar to the detected set of one or more significant words in the first electronic message. The aspects of the disclosed embodiments automatically reduce a text or document to a set of keywords. The remaining set of keywords can be matched to sets of keywords in other electronic messages to identify similarities. This provides a faster way to compute relationships between messages.

In a first possible implementation form of the apparatus according to the first aspect, the processor is configured to detect the set of one or more significant words in the first electronic message by identifying one or more words in the first electronic message, subtracting average language words from the identified one or more words to form a remaining set of words, wherein the remaining set of words comprises the set of one or more significant words. Reducing the content of the message to a set of significant words or keywords identifies the words that make the particular message or document unique. Common words are eliminated, providing a simpler model that makes it faster and easier to compute similar patterns and relationships between message content.

In a second possible implementation form of the apparatus according to the first aspect as such or the first possible implementation form of the apparatus according to the first aspect, the processor is configured to translate the set of one or more significant words in the first electronic message into a machine readable format. Translating the raw data into a machine understandable language advantageously enables the use of text based classification and analysis. This is advantageous as the system of the disclosed embodiments should be agnostic as to what it describes, which allows for the processing of the words or parameters in a reliable manner.

In a third possible implementation form of the apparatus according to the first aspect as such or to any of the preceding possible implementation forms of the apparatus according to the first aspect, the processor is configured to represent the set of one or more significant words in the first electronic message and each set of one or more significant words in the other electronic messages as vectors, compute a cosine distance between the vector representing the set of one or more significant words in the first electronic message and each vector in the other electronic messages and use the computed cosine distances to identify other electronic messages that are similar to the first electronic message. The aspects of the disclosed embodiments translate the sets of words into vectors. Similar relationships between different vectors are determined and can be used to form the basis for identifying similar relationships.

In a fourth possible implementation form of the apparatus according to the first aspect as such or to any of the preceding possible implementation forms of the apparatus according to the first aspect the processor is configured to detect the set of one or more significant words in the first electronic message by detecting a word in the first electronic message, identify a vector corresponding to the detected word or generate a new vector for the detected word if a vector corresponding to the detected word is not identified, encode a transition matrix for the first electronic message with vectors corresponding to each word in the first electronic message, subtract an average language transition matrix from the encoded transition matrix for the first electronic message, wherein a result of the subtraction corresponds to the set of one or more significant words in the first electronic message. Since each row in the matrix represents a word, the computation of similarities between the vector representations of the significant words is simpler and faster.

In a fifth possible implementation form of the apparatus according to the first aspect as such or to any of the preceding possible implementation forms of the apparatus according to the first aspect the processor is configured to detect the set of one or more significant words in the first electronic message using a random index system. The use of a random index system provides a reliable text classification system and enables identifying similarities between a current set of words and previously generated sets of words.

Random index algorithms have been used for natural language processing and text classification. The paper by Magnus Sahlgren entitled "The Word-Space Model: Using distributional analysis to represent syntagmatic and paradigmatic relation between words in high-dimensional vector spaces" describes the use of Random Indexing in text classification. However, Sahlgren merely describes text classification. There is no teaching related to predicting user actions on or with a mobile device. Use of a Random Indexing Algorithm in accordance with the aspects of the disclosed embodiments enables determining relationships between electronic mail messages based on text analysis without the need for a programmer to explicitly program the activity model.

In a first possible implementation form of the apparatus according to any of the fourth and fifth possible implementation forms of the apparatus according to the first aspect as such, the processor is configured to encode the result of the subtraction into a vector representation, compare the vector representation to a matrix of vector representations, where each vector representation in the matrix is associated with an identifier, associate an identifier with the vector representation, the identifier comprising a new identifier if the vector representation is not similar to an existing vector representation in the matrix, or if the vector representation is similar to an existing vector representation in the matrix, associate the vector representation with an identifier of the similar existing vector representation in the matrix, and identify other electronic messages with a same identifier, the other electronic messages with the same identifier comprising the similar electronic messages. This is advantageous because there is a vector for each word and a row in the transition matrix for each word. The similar messages that are presented are determined by comparing the vectors in the transition matrix to the vector. The words in the rows of the matrix corresponding to similar vectors form the basis for identifying similar messages and text. The identifiers can be mapped back to the actual message, providing a simpler and faster way to compute and identify related messages and text.

In a first possible implementation form of the apparatus according to the first possible implementation form of any of the fourth and fifth possible implementation forms of the apparatus according to the first aspect as such the processor is configured to determine if the vector representation is similar to an existing vector representation in the matrix using a cosine similarity measure. Vector representations provide a reliable and faster way to compute similarities.

In a sixth possible implementation form of the apparatus according to the first aspect as such or to any of the preceding possible implementation forms of the apparatus according to the first aspect the apparatus comprises a UI, and the processor is configured to present the first electronic message in a first portion of the UI and the second electronic message in a second portion of the UI. The aspects of the disclosed embodiments provide an automated manner of presenting similar messages in a readily identifiable manner on the display of a device.

In a seventh possible implementation form of the apparatus according to the first aspect as such or to any of the preceding possible implementation forms of the apparatus according to the first aspect the first electronic message comprises an electronic message that is open or selected on or in an electronic messaging application. When a message is selected, such as by opening, the aspects of the disclosed embodiments can automatically identify and present other messages that are similar to the open or selected message without the need for additional steps or search parameters.

In a first possible implementation form of the apparatus according to the seventh possible implementation form of the apparatus according to the first aspect as such the electronic messaging application is one or more of an electronic mail application, a chat application, or a social media application. The aspects of the disclosed embodiments are applicable to any electronic or text based messaging application or program.

In an eighth possible implementation form of the apparatus according to the first aspect as such or to any of the preceding possible implementation forms of the apparatus according to the first aspect the first electronic message is an electronic mail, a chat message, a blog entry, or a social media entry. The aspects of the disclosed embodiments can analyze the text based content of a variety of different types of messages and identify similar messages in a fast and reliable manner.

According to a second aspect of the present disclosure the above and further objects and advantages are obtained by a method for identifying similar electronic messages. The method includes detecting a first electronic message, detecting a set of one or more significant words in the first electronic message, comparing the detected set of one or more significant words in the first electronic message to one or more sets of one or more significant words from a plurality of other electronic messages and presenting at least a second electronic message from the other electronic messages that includes a set of one or more significant words that is similar to the detected set of one or more significant words in the first electronic message. The aspects of the disclosed embodiments automatically reduce a text or document to a set of significant words or keywords. The set of keywords can be matched to sets of words of other messages in the application or program to identify patterns between different messages. This provides a faster way to identify and compute relationships between messages.

In a first implementation form of the method according to the second aspect as such, the method includes detecting the set of one or more significant words in the first electronic message by identifying one or more words in the first electronic message, subtracting average language words from the identified one or more words to form a remaining set of words, wherein the remaining set of words comprises the set of one or more significant words. Reducing the content of the message to a set of significant words or keywords identifies the words that make the particular message or document unique. Common words are eliminated, providing a simpler model making it easier and faster to compute similar patterns and relationships between different message content.

According to a third aspect of the present disclosure the above and further objects and advantages are obtained by a computer program product including non-transitory computer program instructions that when executed by a processor cause the processor to perform the method according to the second aspect. The foregoing and other objects are achieved by the features of the independent claims. Further implementation forms are apparent from the dependent claims, the description and the figures.

These and other aspects, implementation forms, and advantages of the exemplary embodiments will become apparent from the embodiments described below considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Figure 1:
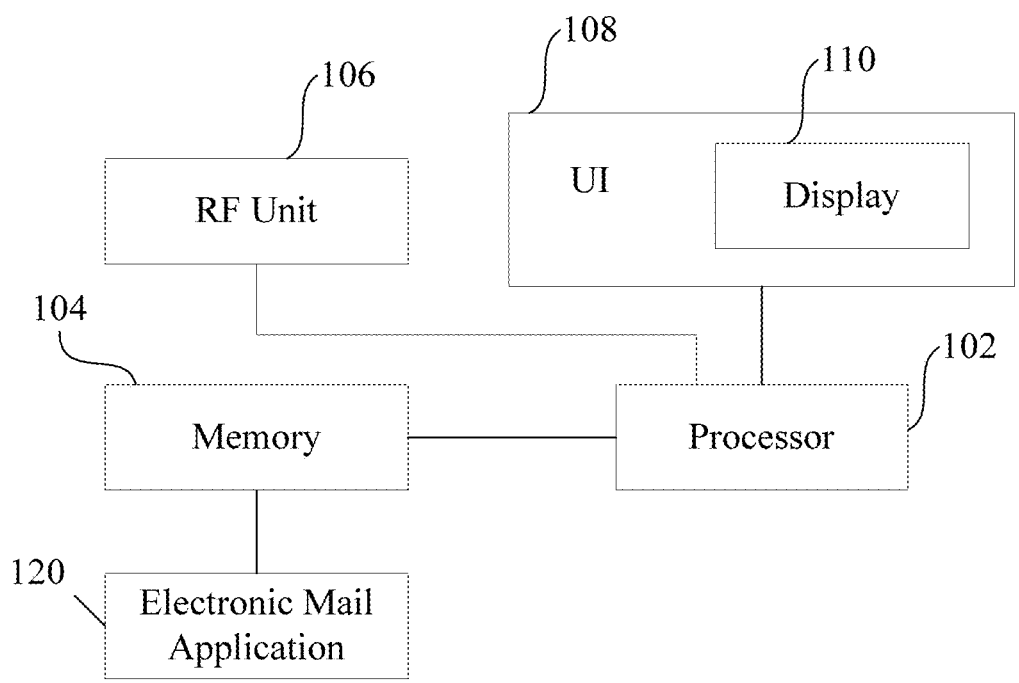
FIG. 1 illustrates a block diagram of a computing device appropriate for practicing embodiments of the present disclosure.

The methods and apparatuses disclosed herein provide an electronic message relation finder system for automatically identifying related messages, and in particular electronic messages, that are relevant or similar to a selected or open electronic message. The electronic messages with text patterns similar to that of the open electronic message can then be presented as the similar electronic message(s).

An electronic message, such as an electronic mail message (generally referred to herein as an "email") will generally include, among other things, text or textual content. Such text or textual content will be generally referred to herein as a "word", "words" or "set of words." The text content of an electronic message will generally include a combination of one or more common words and significant words, also referred to as keywords. Common words might be those words that tend to occur frequently in different electronic messages, but do not differentiate one electronic message from another electronic message (such as and, the, I, me, you, or, as, of). Significant words or keywords are those words that can be used to differentiate one message from another. Significant words can occur infrequently as well as frequently.

In one embodiment, the significant words in an electronic message, such as an open email of an email application, are identified. Similarities between the significant words in the open electronic message and significant words of other electronic messages are determined. The other electronic messages with sets of significant words that are similar to the set of significant words of the open electronic message can then be identified and presented as similar electronic messages.

For the purposes of the disclosure herein, an electronic message may generally be referred to as an "email", "emails" or "document." However, the aspects of the disclosed embodiments are not so limited and can including any type of electronically based message, application or document that includes, or has, text content. These electronic messages or documents can include, for example, but are not limited to, a short message service (SMS), an electronic document, a social media application, a blog application, or an instant messaging application.

The aspects of the disclosed embodiments make use of a random indexing system to automatically create and match textual patterns of different emails. The random index system can be configured to learn or know the average English language, for example, or any other language on which the electronic messaging application is based. For example, the random index system of the disclosed embodiments can learn the particular language of the electronic messaging application by being trained on a corpus and generate a corresponding language random index matrix. In one embodiment, the random indexing system can learn the language from plain text documents and does not need a pre-defined dictionary or stop word list. The dictionary or word list is automatically created and the system is self-adaptive.

A vector representation of the significant words in each of the different electronic messages is created. If similar vectors in a random index matrix can be identified, the electronic messages that are associated with the similar vectors are identified as related, similar or otherwise relevant. This might also be referred to herein as pattern matching. These similar electronic messages can then be presented in a manner as is generally described herein.

FIG. 1 illustrates a block diagram of an apparatus or device 100 appropriate for implementing aspects of the disclosed embodiments. The illustrated apparatus 100 according to an embodiment of the present disclosure includes a processor 102 coupled to a computer memory 104, an optional radio frequency (RF) unit 106, a UI 108 and an optional display 110. The apparatus 100 is appropriate for use as a computing or communication device on which an electronic mail or messaging application or program can be operated. In one embodiment, the apparatus 100 may be or can include any one or more of various types of wireless communications user equipment including cell phones, smart phones and tablet devices.

The processor 102 may be a single processing device or may comprise a plurality of processing devices including special purpose devices, such as for example, digital signal processing (DSP) devices, microprocessors, specialized processing devices or general purpose computer processors. The processor 102 is configured to perform the electronic message pattern matching, categorization, indexing and presentment as is generally described herein.

The processor 102 is coupled to a memory 104 which may be a combination of various types of volatile and non-volatile computer memory such as for example read-only memory (ROM), random access memory (RAM), magnetic or optical disk, or other types of computer memory. The memory 104 stores computer program instructions that may be accessed and executed by the processor 102 to cause the processor to perform a variety of desirable computer implemented processes or methods.

The program instructions stored in memory 104 are organized as sets or groups of program instructions referred to in the industry with various terms such as programs, software components, software modules, units, etc., where each program may be of a recognized type such as an operating system, an application, a device driver, or other conventionally recognized type of software component. Also included in the memory 104 are program data and data files which are stored and processed by the computer program instructions. In one embodiment, an electronic messaging or mail application or program 120 is part of or coupled to the memory 104.

The RF Unit 106 is coupled to the processor 102 and configured to transmit and receive RF signals based on digital data exchanged with the processor 102. The RF Unit 106 is configured to transmit and receive radio signals that may conform to one or more of the wireless communication standards in use today, such as for example GSM, UMTS, Long Term Evolution (LTE) and LTE-Advanced (LTE-A) developed by the third generation partnership project (3GPP), WI-FI based on the Institute of Electrical and Electronics Engineers (IEEE) 802.11 standards, as well as many others. In certain embodiments, the RF Unit 106 includes receivers capable of receiving and interpreting messages sent from satellites in the global positioning system (GPS) and work together with information received from other transmitters to obtain positioning information pertaining to the location of the device 100.

The UI 108 may include one or more UI elements such as a touch screen, keypad, buttons, voice command processor, as well as other elements adapted for exchanging information with a user. The UI 108 may also include or be connected to a display unit 110 configured to display a variety of information appropriate for a computing device, a mobile computing device or mobile user equipment and may be implemented using any appropriate display type, which can include for example organic light emitting diodes (OLED), liquid crystal display (LCD), as well as less complex elements such as LEDs or indicator lamps. In certain embodiments the display unit 110 incorporates a touch or near touch screen for receiving information from the user.

The device 100 described above and illustrated in FIG. 1 is appropriate for implementing any of the apparatus and methods disclosed herein. The processor 102 may be configured to perform the methods described in the foregoing and the following.

Figure 2:
FIG. 2 illustrates an example of a UI for a conventional email program.

FIG. 2 illustrates an example of a UI 200 illustrating the presentation of electronic mail items or messages of a conventional email program on an electronic device. As is illustrated in this example, the UI 200, which might be referred to as the "in-box" of the email application, provides a set 202 of pre-defined static email categories. These pre-defined categories in the set 202 classify and organize certain emails within one of these categories. Other, non-categorized emails 204 are presented in a non-categorized manner. While emails can be placed in the set 202 of categories as illustrated in FIG. 2, these email programs do not automatically find and identify emails in the email in-box that are related or similar to each other in a manner as is described herein. While the email in-box is generally referred to herein, it will be understood that the aspects of the disclosed embodiments can be applied to any portion or folder of the messaging or email application, other than including the in-box.

Figure 3:
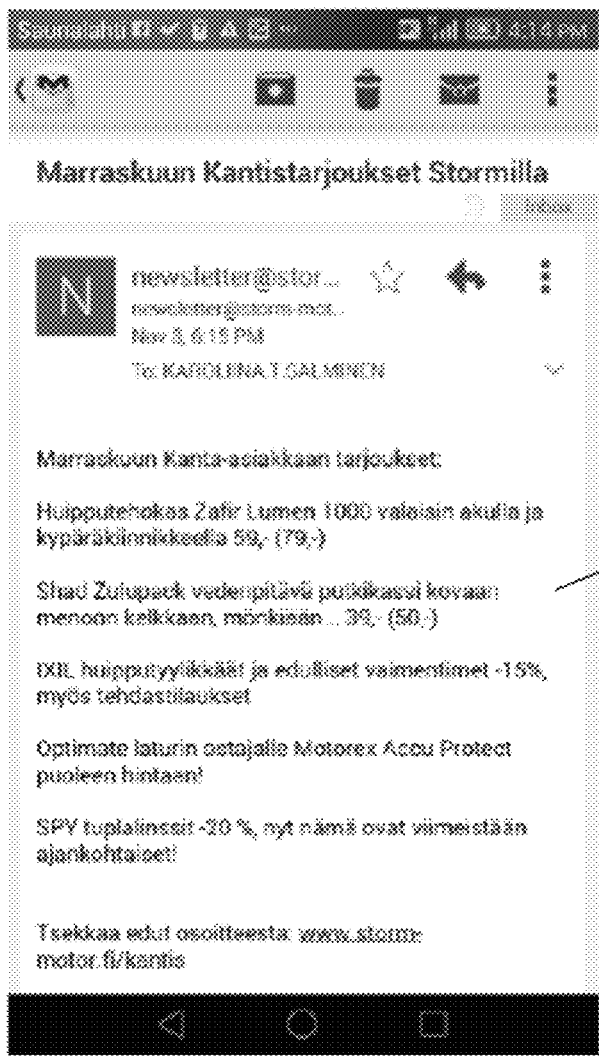
FIG. 3 illustrates another example of a UI for a conventional email program.

FIG. 3 illustrates an example of an open email in a conventional email program. As is shown in this example, the body 302 of the email is presented on the UI 300 of the device, such as the device 100 of FIG. 1, which in this example, is a mobile communication device. As illustrated in this example, only the content of the email is shown, which comprises text. There is no identification of emails that may be relevant or similar to the email being displayed.

Figure 4:
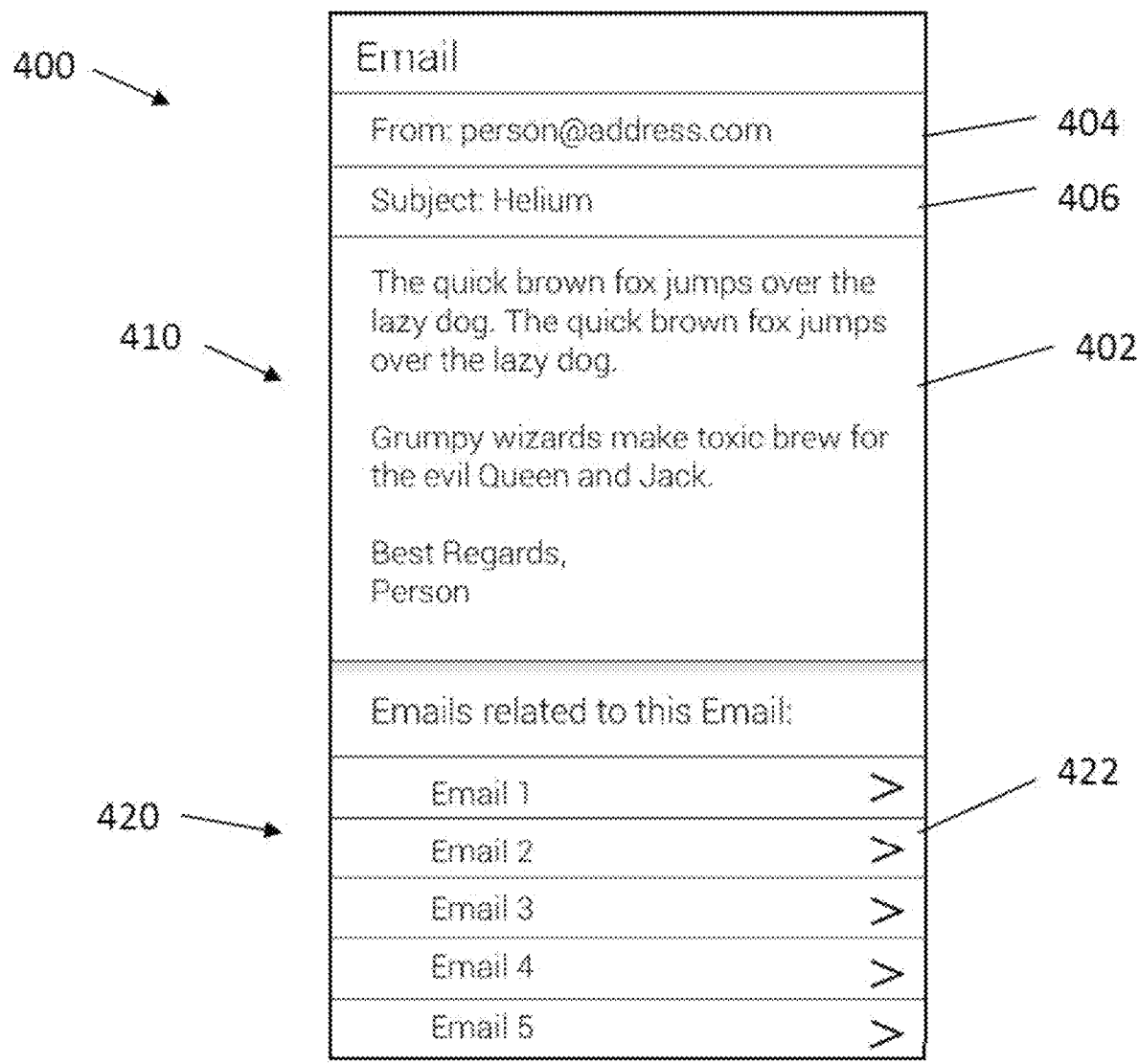
FIG. 4 illustrates a block diagram of an exemplary UI for a computing device incorporating aspects of the disclosed embodiments.

FIG. 4 is an illustration of a UI 400 presenting an exemplary email 410 presented in accordance with aspects of the disclosed embodiments. Although an email is illustrated in FIG. 4, it will be understood that the UI 400 can be configured to present any electronic document, such as a web page, document, or WIKIPEDIA™ document, for example. The UI 400 can be implemented on a computing device, such as the device 100 shown in FIG. 1. In this example, the body or content of the email 410 is presented in a first section 402 of the UI 400. The email 410 in this example also includes a "From" section 404 and a "Subject" section 406, as those are generally understood. In alternate embodiments, the email 410 can include any suitable sections.

The email 410 is shown in FIG. 4 as only including text or words. In alternate embodiments, it will be understood that the email 410 can also include other elements and objects, such as images and graphical objects. These other elements and objects may also include text, which can be analyzed and categorized to identify similar patterns, as is generally described herein.

The UI 400 includes a second section 420, which in this example is indicated as the "Emails related to this Email" section. This second section 420 is configured to present one or more other emails 422 that are identified as similar to the open email 410, in a manner as is described herein. In the example shown in FIG. 4, the one or more other emails 422 are presented as or to include selectable links, which if selected or activated in a manner as is generally understood, will lead to a presentation or display of the actual or underlying email. Thus, in a manner as is generally understood, clicking on a link will cause the underlying email to open in the same window, or another window, in the viewing area of the UI 400.

Although five other emails 422 are shown in FIG. 4 as the similar emails, in alternate embodiments, any suitable number of similar emails can be presented. In one embodiment, the number of similar emails that are presented on the UI 400 can be predefined or pre-set by the user. For example, the user may only want to see the top 2, 5 or 10 emails that are similar to the selected or open email on the UI 400. The aspects of the disclosed embodiments allow for the user to set a desired number.

Further, the identifying information or detail pertaining to the other emails 422 shown in FIG. 4 can include any suitable information. For example, in one embodiment, the identifying information for the other emails 422 can include one or more of a subject, a title, or a date. The aspects of the disclosed embodiments can allow for the user to designate what information to provide.

Figure 5:
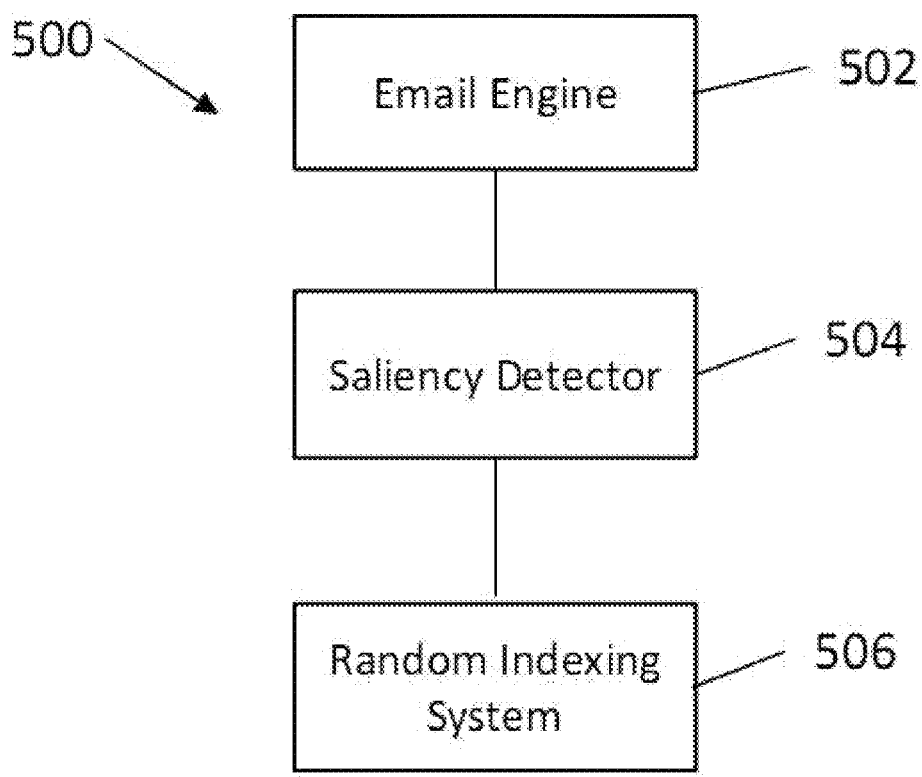
FIG. 5 illustrates a block diagram of an apparatus incorporating aspects of the disclosed embodiments.

FIG. 5 illustrates a block diagram representation of an electronic messaging pattern matching and categorization system 500 incorporating aspects of the disclosed embodiments. The electronic messaging pattern matching and categorization system 500 of the disclosed embodiments provides for identifying other electronic messages that are similar or related to an open electronic message. In the example of FIG. 5, the electronic messaging pattern matching and categorization system 500 includes an electronic mail or messaging application or engine 502, generally referred to herein as an email engine 502, a saliency detector 504, and a random indexing system 506. In alternate embodiments, the system 500 can include such other components, devices or systems for identifying and displaying electronic messages that are relevant or similar to an open electronic message.

The electronic messaging pattern matching and categorization system 500 is generally configured to be included with or part of the exemplary device 100 illustrated in FIG. 1. In one embodiment, the system 500 is part of the operating system of the device 100. Unlike other systems where personal data needs to be transferred from the device 100 to a server or the cloud, the aspects of the disclosed embodiments do not require any such data transfer. Personal user content and user data security is maintained locally, providing a more robust and secure system.

The aspects of the disclosed embodiments are configured to detect or otherwise identify an electronic message, such as an email. The text of that email will be compared to for example, the text of other emails in or associated with, the email engine 502. For the purposes of the description herein, this email will be referred to as the selected email. The selected email can be in or from any suitable portion or folder of the email application, such as the in-box or sent items folder. It will be understood that emails are received and stored in anyone of a number of storage repositories, such as folders, in an email engine 502. The aspects of the disclosed embodiments are not limited to emails that might be stored in the email engine 502. In alternate embodiments, the emails can be saved or stored in any suitable storage repository that is associated with, or can be accessed by, the email engine 502.

In accordance with the aspects of the disclosed embodiments, when the selected email is opened, or otherwise identified, in the email engine 502, the content of the selected email is delivered to, or otherwise obtained by, the saliency detector 504. In one embodiment, saliency detector 504 is coupled to the email engine 502 and is configured to parse or scan the selected email for text content. After the text content is identified, the saliency detector 502 is configured to reduce the text content of the selected email into one or more significant words, also referred to herein as "keywords." The one or more significant words in the selected email are those words that are unique to the selected email or can otherwise be used to distinguish the selected email from other emails. In one embodiment, the saliency detector 502 is configured to discard common words identified in the text of the email, leaving only significant words.

The saliency detector 504 generally functions to identify what is unique in terms of textual content in the selected email versus all the other emails the email engine 502 has processed or stored. In one embodiment, the saliency detector 504 is configured to learn or "know" the average picture or pattern of average language that forms the basis of the email engine 502. This can include the English language or any other language.

In one embodiment, common words that frequently occur in all the emails, but do not differentiate the emails, are discarded. The saliency detector 504 is configured to algorithmically discard those words which frequently appear in the email, but are not special or unique. Words that are not special or unique are generally those words that cannot be used to distinguish the text of one email from the text of another email.

In one embodiment, the system 500 is configured to be trained using a corpus and create a language specific random index matrix based on the corpus, which can be referred to as an average language model. Language context transitions (word A->word B) are encoded into a sparse transition matrix. An index vector is generated for each newly found word, and the index vector is stored in memory, such as the memory 104 of FIG. 1. As is described in more detail below, this learning process can occur before the user starts to use the email engine 502 to ensure that the categorization is significantly knowledgeable or intelligent from the beginning.

The term "index vector" as is used herein, generally refers to a vector in the random index that represents an input pattern, for example a word that is always the same. For example, there is a dictionary of words, each corresponding to a sparse vector. A "sparse vector", as that term is used herein, generally refers to a vector that is sparsely populated, e.g., a vector with 10,000 storage locations, where only few indexes are occupied. In the dictionary of words, where each word corresponds to a sparse vector, each sparse vector is an index vector that tells which indexes represent this pattern (for example a word).

A random index is a matrix that consists of sparse vectors of some kind (sparse matrix). The indexes are randomly populated, meaning that the indexes in the index vectors are produced with a random generator. A random index matrix is a sparse matrix that is populated with the random index.

The nature of the documents that are used in the training to create the average language model can include any suitable documents. The system 500 needs to be able to learn enough "word" experience from these documents to develop the average language model. For example, the system 500 can be trained using novels in plain text format that are inputted into the system 500 in a suitable manner.

In one embodiment, the saliency detector 504 is configured to learn one common pattern for the language, which generally describes a usual occurrence of words in a text of that language. A threshold is used to allow only common words into that pattern. As noted above, common words are those words that might frequently occur but are not unique, or cannot be used to differentiate one document or message from another document or message. In one embodiment, the saliency detector 504 is configured to algorithmically discard common words from the text of the electronic message.

As an example, during a learning or pre-training cycle, the words in the documents used for the learning are weighted. The weights of the words are multiplied so that the more frequently occurring words in the language model are less likely to be included in the set of significant words. The weighting occurs so that when the index vectors are summed together to form the sparse matrix of the document, the weights (i.e. the numbers in the indexes) increase. In one embodiment, there does not need to be a per word weighting in a look-up table. Rather, the weighting of the words occurs in the sparse matrix itself. The documents are pushed in where the linguistic context for each word is encoded with its preceding word or words (i.e. transitions between the words). A word that precedes a word is considered to be the context for the word. For example, "Car is white" and "Cat is white" both involve the word "white." However, the context is different as one refers to cars, and the other to cats. The "transitions" refer to the changes between words. The phrase "Car is white" has transitions car->is->white. The aspects of the disclosed embodiments form a mathematical representation of the word and encodes that after "car" comes "is" and after "is" comes "white" and so on. Where there are a number of transitions, these words receive weights that are much greater than 1 (uses integer values from 0 to 2^32).

The most common words in the average language are generally those which are not important words in the document. The words that may be frequent in the document, but do not appear so frequently in the average language, are generally those words which are important in the document. In this manner it is possible to extract special words from the document. These special words often describe or generally indicate what the document is all about. For example, may documents will include words such as "the, a, an, to, in, I" and so on. However, these words do not generally provide an indication as to what the document or message is about. However, a document that is reduced to the significant or keywords using the extraction method may result in a set of keywords such as "Mars, colony, Elon, Musk, SpaceX." These words may provide a greater sense of context or what the document is about rather than if the document is described by the set of words "if the a an in this but and its."

In one embodiment, eliminating the common words can include applying an inverse log function to the weights of the words to arrive at the reduced set of words, or set of significant words. The words in the average language model are weighted so that rare, or uncommon words do not end up in a transition matrix for the average language model, as is described below. Rather, only the common words will end up in the transition matrix for the average language model.

As noted above, the average language model or pattern that is created is also represented by a transition matrix. The transition matrix for the selected email is compared to the transition matrix for the average language model, by for example, subtracting the transition matrix for the average language model from the transition matrix for the selected email. In one embodiment, the text content of the selected email can be reduced to one or more significant words by multiplying the transition matrix generated for the selected email with an inverse exponential function multiplied with the saturation of the vectors of the same words (saturation varies from 0 to 100%, hence the multiplier is a floating point value between 0.0 and 1.0).

In this manner, common words in the text content of the selected email are deleted and the text content of the selected email is reduced. The aspects of the disclosed embodiments also reduce so called "stop words", without specifying a stop word dictionary (i.e. a list of keywords which contribute no significant meaning to the email in this categorization purpose). The result is a list of keywords that makes the selected email unique in terms of text content.

The result of the reduction of words in the email to a set of significant words can be encoded into a sparse vector by adding the index vectors of the words in the set of significant words into the sparse vector. The end result is that the sparse vector contains several index vectors combined into the one sparse vector. If one index vector identifies one word, and the index vector consists of 20 random indexes and there are 20 significant words in the set of significant words, the resulting sparse vector has 20×20=400 indexes, evenly distributed in the sparse vector. The resulting vector now has 400 indexes randomly allocated from a sparse vector with 10000 or more dimensions.

The resulting vector can be added into a matrix of pattern vectors if it is a new pattern. If it is an old pattern, then the matrix of pattern vectors, as will be further described below, does not need to be modified. In one embodiment, each pattern vector in the matrix has its own unique identifier. The unique identifier, referred to herein as a "category identifier" can be returned to the email engine 502, where the email engine 502 can maintain a mapping of category identifiers to emails in the email engine 502.

As noted above, in one embodiment, the saliency detector 504 is configured to determine the significant words in the selected email by subtracting the average language words, as determined from the average language model, from the text content of the selected email. The remaining words in the set comprise the set of significant words. In one embodiment, the text content of the selected email can be reduced by creating a vector representation of the set of significant words in the selected email, also referred to as a sparse matrix. The rows of the sparse matrix will correspond to the words in the set of significant words. An index vector is generated when a new significant word is detected. When a significant word in the set of significant words is not new, the index vector corresponding to this significant word in the sparse matrix is used.

In one embodiment, the random index system 506 is configured to compare the set of significant words of the selected email to one or more sets of significant words of other emails in the email engine 502 to find similar or related emails. For example, in one embodiment, each time an email is received in the email engine 502, the text content of the received email is reduced to a set of significant words. This set of significant words is stored together with other sets of significant words, which can then be used as the basis for comparison to find similar or related emails.

The random index system 506 is configured to calculate a similarity, such as for example a semantic similarity, between the set of one or more significant words of the selected email and the set of one or more significant words of the other emails that are currently saved or present in the email engine 502. In one embodiment, in order to calculate a similarity between the different sets of one or more significant words, as described above, the sets of one or more significant words are translated into vectors, also referred to as index vectors. The different index vectors are joined together by a union between the index vectors. A pattern index, such as a random index matrix for example, is used to store the different index vectors. Each row in the random index matrix represents a significant word and is updated with a vector by vector summation.

The index vector formed corresponding to the set of significant words of the selected email is used for identifying similar index vectors in the random index. This includes identifying the closeness or similarities between the index vectors that are used to represent the set of one or more significant words of the selected email and the vectors that are used to represent the set of one or more significant words of other emails in the email engine 502.

In one embodiment, the closeness or similarity can be calculated using, for example, one or more of a cosine distance or dot product calculation between the different index vectors. When the similarity is determined using a cosine similarity measure between index vectors, the index vectors from the random index that are similar to the index vectors corresponding to the significant words of the selected email will have a high cosine similarity measure.

If an existing pattern vector is found in the random index that is similar enough, the category identifier of the existing pattern vector is returned. The category identifier of the corresponding row in the random index is used to identify other emails in the email engine 502. As is noted above, the email engine 502 maintains a mapping of category identifiers to the corresponding emails. Thus, once a category identifier is determined, the other emails in the email engine 502 with a category identifier matching this category identifier are those that are similar to the selected email. The other email or emails can then be presented on the UI 108 of the device 100, in a manner similar to that illustrated in FIG. 4. While one email is referred to above, in alternate embodiments, more than one email can be determined to be similar to the selected email.

The level of closeness to be used to identify similar emails can be predefined by the system 500 or the user of the device 100. While the level of closeness does not need to be exact or accurate, the looser the criteria, the more false positives that may result.

When a similar index vector in the random index is not identified, a new row is added to the random index. A new category identifier is generated and is associated with the new row added to the random index containing the newly generated pattern vector. The index vector of the significant words of the selected email forms the new row, which will have the new category identifier.

In one embodiment, a transition matrix is used in the unreduced content or pattern of the selected email. The reduced content is no longer a transition matrix, but a vector representing the co-occurrences of sets of one or more significant words. This flattens the time domain (i.e. the causality) as a side effect of the reduction of the content of the selected email. This can be necessary, because word transitions in emails talking about the same thing are not always similar. There are multiple ways to phrase sentences and sequences of sentences, without changing the meaning of the sentences. Thus, different emails that are discussing the same or similar subject may have the same words co-occurring, but the words may not be in exactly the same order. In accordance with the aspects of the disclosed embodiments, the order of words and sentences during the reduction of the text content into the sets of one or more significant words is not relied on or not significant.

The index vector is a unique vector representation for a word. There is a 1:1 mapping from word to index vector. From the vector, it can be computed if the index vector of the word is present in the sparse vector. In the system 500, there is a 20 times redundancy. Thus, there does not need to be a 1:1 or 100% match in the indexes in the sparse vector to identify the index vector of the word.

As noted above, the category identifier is mappable to a row of the random index. As described above, the aspects of the disclosed embodiments enable determining similar emails by computing the cosine distance of each index vector in the random index matrix with the index of the vector of the selected email. In an alternate embodiment, the percentage of the index vector that is present in a row can be determined.

Since the sparse vectors in the random index matrix are sparse, the collision of random index vectors being added to the index vectors of the random index does not pose a problem in the system 500 of the disclosed embodiments. For example, using a small number of indexes from 0 to 999 and 4 indexes per index vector, and a legend: index, value, we have:

Index Vectors:
cat: 5, −1, 137, 1, 445, 1, 655, −1
eats: 220, 1, 333, −1 445, −1 800, 1
cat food: 24, −1, 79, 1, 200, −1, 980, −1

The sparse vector for the set of one or more significant words or phrase "cat eats cat food" becomes: index vector of cat+index vector of eats+index vector of cat food=5, −1, 24, −1, 79, 1, 137, 1, 200, −1, 220, 1, 333, −1, 445, 0, 655, −1, 800, 1, 980, −1.

In this example there is one overlap that randomly occurs due to statistics. The index vector for "eats" overlaps with the index vector for "cat" in one index. The overlap is not a problem because the calculated cosine distance between the index vectors is not severely affected by it. Therefore, it is not a problem to add sparse vectors together because they mostly do not have overlapping indexes.

As noted in the example above, in the case of 20 representations of significant words in one category, only 400 indexes are occupied out of, for example, the available space for 10000 dimensional vectors, resulting in a 4% fill ratio. The fill ratio generally describes the percentage of the storage locations in a sparse vector (e.g. 10000 long) that are occupied out of the available empty locations. This means that a problem would occur if the sparse vectors in the random index fully saturate (a fill ratio reaching nearly 100%). A vector is fully saturated when there is a number in every index (between for example the 0 and 9999) that does not equal to zero.

As an example, the selected electronic message comprises a document from WIKIPEDIA about "savannah_cats." Wikipedia article of Savannah cat. http://en.wikipedia.org/wiki/Savannah_cat. The other electronic message includes a web page providing information about "Bengal cats." Input: Wikipedia article of Bengal cat: http://en.wikipedia.org/wiki/Bengal_cat.

The reduced output of the selected electronic message on savannah cats using the saliency detector 504 of the disclosed embodiments results in the set of words: "savannah savannahs cats domestic breed cat generation." The reduced output of the other electronic message about Bengal cats using the saliency detector 504 of the disclosed embodiments results in the set of words: "cat bengal cats breed spotted domestic bengals." Of these two example documents, both are about cats. However, they are also different, each talking about a different cat breed. One will find, that the cosine similarity of these two sets of words, as is described herein, is similar, but not exactly the same. The aspects of the disclosed embodiments allow for a cosine similarity threshold to be adjusted to determine what is categorized as similar. Thus, while, the text content of both of the electronic messages is different in that they contain different words, phrases, sentences and word orders, in accordance with the aspects of the disclosed embodiments, the two electronic messages can still be determined to be similar to each other.

In the above example, the cosine difference between the index vector of the reduced representation of the WIKIPEDIA document about "savannah cats" and the index vector of the other electronic message (the Bengal cat web page) will identify the similar or related relationship. In accordance with the aspects of the disclosed embodiments, the link to the Bengal cat web page, Wikipedia article of Bengal cat: http://en.wikipedia.org/wiki/Bengal_cat, can be presented to the user on the UI 400 of the device 100, as is generally described herein.

In one embodiment, the words in the sets of significant words described herein are generally in the form of a machine-understandable language. One example of such a machine-understandable language is the W3C URI format. Table 1 below illustrates a set of words as W3C notation.

TABLE 1

```
flat://on
utc://2013-08-20T12:23:44
gps://60.1954075/24.9484521
proximity://NEAR
timezone://EET
lighting://LIGHT
timeOfDay://AFTERNOON
orientation://FACE UP
motion://STILL
wifiNetwork://ssid/AndroidAPks
wifiNetwork://ssid/HWFBCPE
wifiNetwork://ssid/NTPC02
address://Plkneentie 14, 00510 Helsinki
appStarted://com.android.phone/null
wifiNetwork://ssid/AndroidAP
timestamp://2013-08-20T15:23:44
wifiNetwork://ssid/E17-19
dayOfWeek://TUESDAY
wifiNetwork://ssid/Vallila Interior Visitor
wifiNetwork://ssid/sipulinet
month://August
location://zone1
wifiNetwork://ssid/jmkn4
wifiNetwork://ssid/Mobile Pirates
wifi://connected/AndroidAPks
wifiNetwork://ssid/matetuuba
stability://UNSTABLE
appNavigated://com.android.phone/com.android.phone.InCallScreen
charger://connected
wifiNetwork://ssid/wlanaccessv2.0
wifiNetwork://ssid/everest
network://Saunalahti
```

The aspects of the disclosed embodiments code a transition matrix of the current set of words of the selected electronic message. This forms a sequential sparse transition matrix of groups of words. By comparing the current set of words to previously generated sets of words, the significant words can be identified.

In one embodiment, each word that occurs in the set of words, such as that shown in Table 1 above, is converted by the random index system 506 into an index vector. An index vector is a sparse vector that is randomly generated with multiple negative and positive small values. In the exemplary embodiment, the initial values are −1 and +1 (i.e. 10 pieces of −1 s and 10 pieces of +1 s distributed in random indices of the 10000 storage location length vector). The aspects of the disclosed embodiments use 10 negative and 10 positive values in random indexes between 0 and 9999. The index vector that is generated is a randomly generated sparse hash for a word.

The random index system 506 is configured to be agnostic to what it describes. Thus, the format of the incoming words, or the current set of words, is not material. The W3C format described herein is useful because it enables the use of labels in the similarity determination phase. This allows for recognition of the similar email as a uniform resource locator ("URL") that can be used to access the underlying email, as was referred to with reference to FIG. 4.

In one embodiment, the random index is saved or backed-up on the memory 104 of the mobile device 100, such as a flash memory for example. In the case of a restart, the random index is loaded from the memory 104 and the system 500 is back online for accumulating more data and performing email comparison as is described herein.

Figure 6:
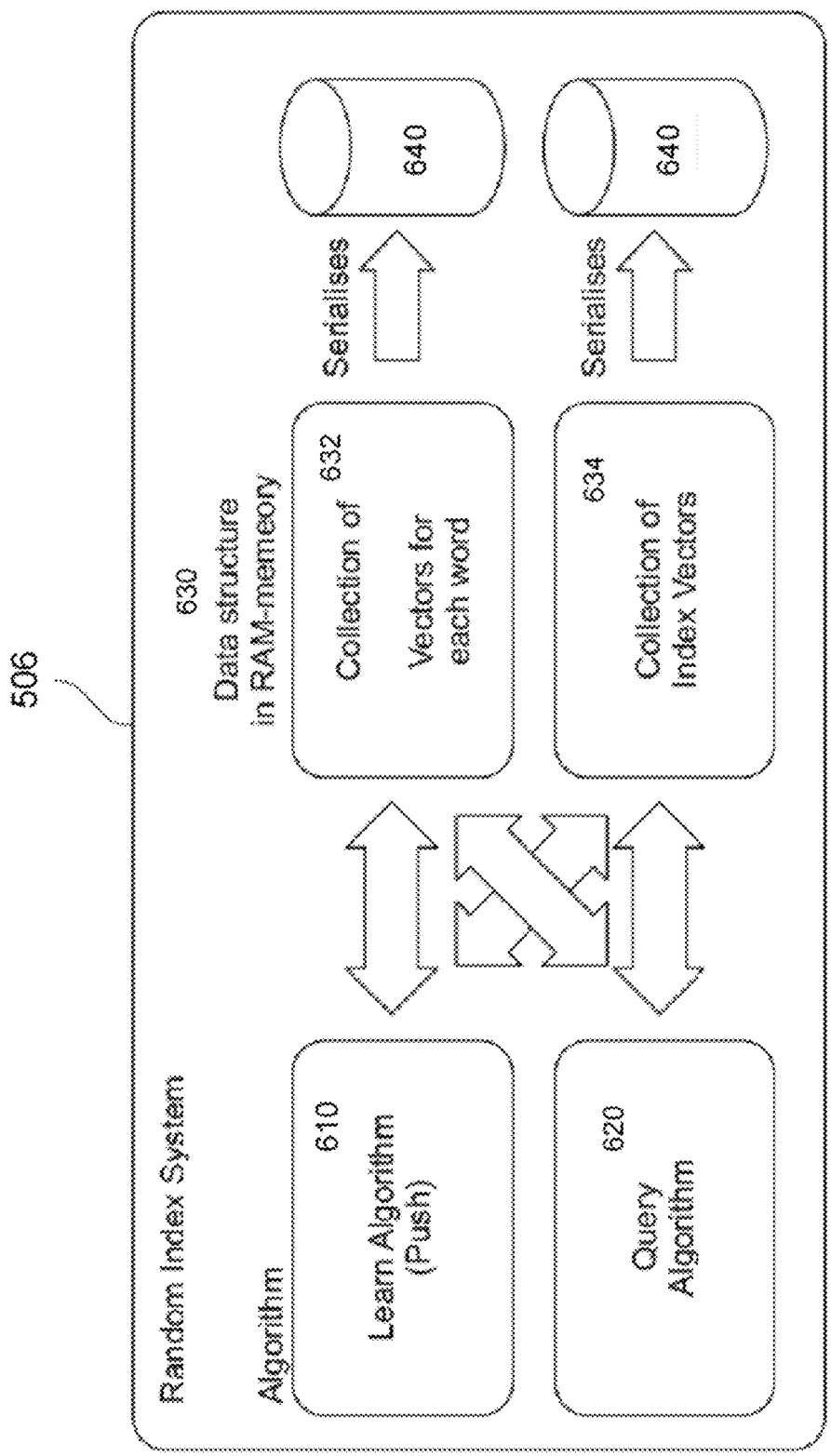
FIG. 6 illustrates a block diagram an exemplary architecture for a random index system incorporating aspects of the disclosed embodiments.

FIG. 6 illustrates a high level architecture of the random index system 506 of FIG. 5. In this example, the functioning of the random index system 506 is divided into two parts, a learning part 610 and a query part 620. The learning part 610 learns from new chains of events or occurrences. For example, the learning part 610 determines the average language model. This data is then stored in the data structure 630. The data structure 630 includes the collection 632 of context vectors for each word and the collection 634 of index vectors. In one embodiment, the data stored in the data structure 630 can be serialized to the file or storage system 640 of the device 100 of FIG. 1. The collection 634 of index vectors is also written to the file system 640 for future use in encoding the words into the sparse representations.

In building the sparse vectors, which is the union of index vectors, the collection 634 of index vectors uses the same representations for the same significant words that have been identified from other emails. In this manner, the storage capabilities of the device 100 are not exceeded. Thus, while each significant word has a sparse representation or index vector that is unique and random, the same sparse representation is always used for the same significant word in future occurrences.

The query portion 620 of the random index system 506 uses the collection 632 of index vectors for each significant word and the collection 634 of index vectors. A bag or set of words represents the significant word and is encoded into the sparse representation by combining the index vector representations of the individual significant words found in the collection 634 of index vectors. The index vector for the selected email is then compared to each index vector in the collection 632 of index vectors, using for example a cosine similarity measure.

Figure 7:
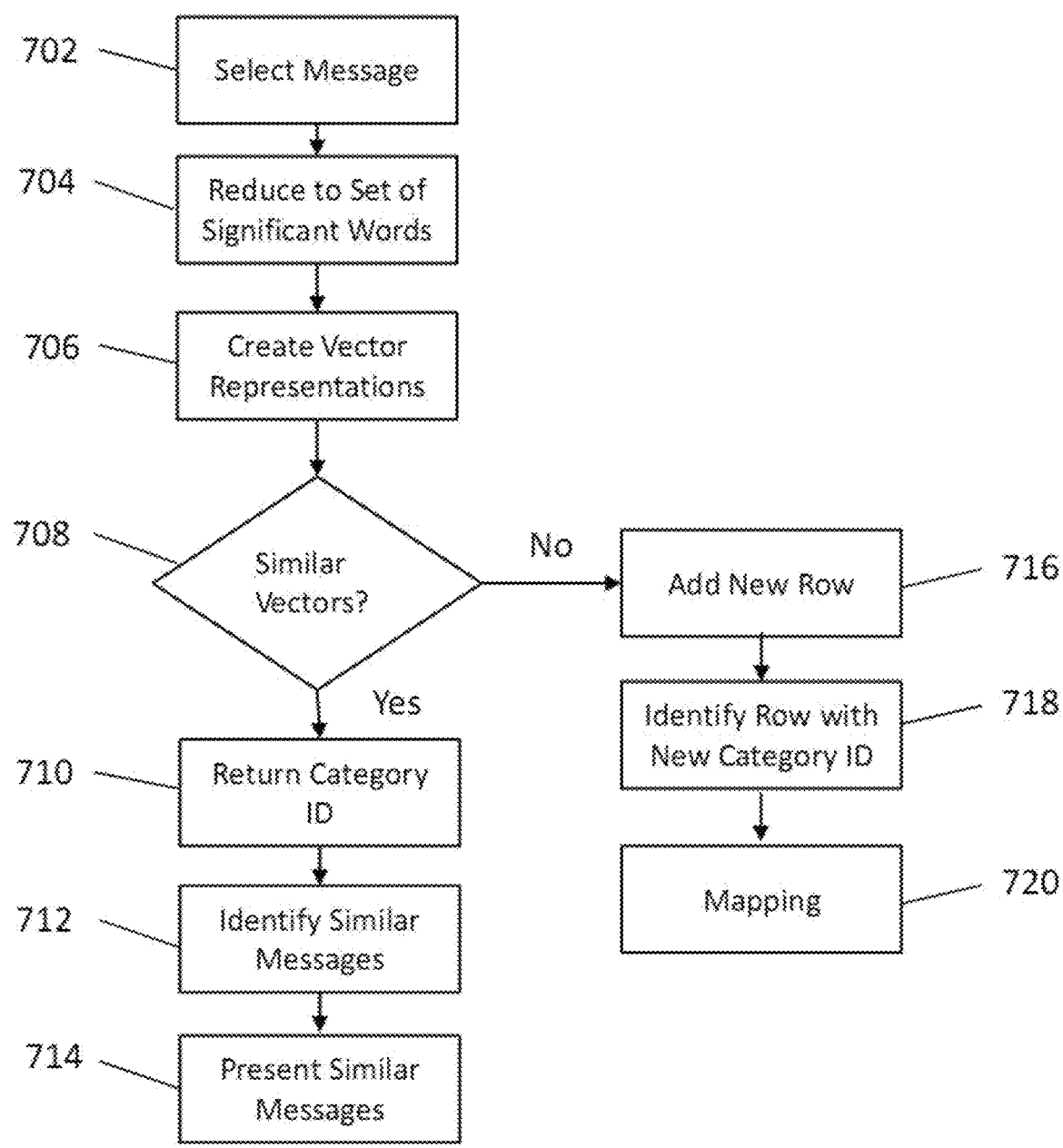
FIG. 7 is a flow chart illustrating an exemplary process incorporating aspects of the disclosed embodiments.

FIG. 7 is a flow chart illustrating one embodiment of a process incorporating aspects of the disclosed embodiments, which can be performed by an apparatus (e.g. by a processor of the apparatus). In this example, an email is selected 702. As noted earlier, the selected email can be an email that is received by the device 100, an email that is being read, or any other email that is capable of being selected or acted on with the email engine 502.

The text content of the email is reduced 704 to a set of one or more significant words. This generally comprises subtracting average or commonly used language from the selected email. The remaining text comprises the set of one or more significant words.

A vector representation of the set of one or more significant words is created 706. For example, after each word in the set of one or more significant words is converted into an index vector, the words are joined together by a union between the index vectors. There are no duplicate words in the set of one or more significant words because the set of one or more significant words is a set of strings. The union of index vectors is a sparse vector, which also has 10000 storage locations between 0 and 9999. The sparse vector is stored in the random index, where each row represents a word and the columns are the 10000 dimensions. This union of index vectors is also referred to as a "context vector" referring to The Word-Space Model" dissertation by Magnus Sahlgren.

The newly generated index vector that was constructed from the selected email, as described by the set of one or more significant words, is then added to every word's row in the random index. These index vectors will identify the significant word that is identified by the row. Thus, if the significant words that result in the index vector are similar to a particular row, the conclusion can be that the significant word in that row is likely to be involved.

It is determined 708 whether one or more index vector is stored in the random index is similar the index vector corresponding to the set of one or more significant words of the selected email. As noted above, good predictions of similar electronic messages can be based on a high cosine similarity. Similar results will receive up to 1.0 and not similar results will receive a 0. In one embodiment, the significant words in the rows corresponding to the index vectors with high cosine similarity measure are sorted in similarity order. If the index vector is dissimilar (=inverse) to the index vector in the random index, then the result will be −1. The results along with the significant words corresponding to the result are added into ordered sets of pairs. The ordering is done with the result as a key so that the bigger value is ranked higher in similarity that a lower value. This is then returned as the resulting sets of one or more significant words that are similar to the set of one or more significant words of the selected emails.

If a similar vector is found from the random index, the row or category identifier is returned 710. Other emails corresponding to the category identifier are identified 712. The device 100 will then present 714, on its UI 108, links to the one or more related electronic messages in a human readable list or arrangement, such as that shown in FIG. 4, for example. In the example of FIG. 4, the selected electronic message is shown as 402 and the related emails 420 are presented as the selectable links 422.

If a similar vector is not identified, a new row is added 716 to the random index. The new row is identified 718 with a new category identifier and the new category identifier is mapped 720 by the email engine 502.

The aspects of the disclosed embodiments provide for identifying similar or electronic messages or documents in an electronic messaging application of a device. Once an electronic message is selected or otherwise identified, the text content of the electronic message is reduced to a set of one or more significant words. The significant words are formed into a bag of words, or data sets. The random index system of the disclosed embodiments makes associations between the selected electronic message and other electronic messages that are part of the electronic messaging engine. By comparing the selected electronic message to previously generated significant data sets of other electronic messages similarities can be identified and similar electronic messages presented. Advantageously, the sparse matrix based approach of the disclosed embodiments is lightweight to compute and can run on a device without the need for a server that might otherwise receive a user's private data.

Thus, while there have been shown, described and pointed out, novel features of the disclosure as applied to the exemplary embodiments thereof, it will be understood that various omissions and substitutions and changes in the form and details of devices and methods illustrated, and in their operation, may be made by those skilled in the art without departing from the spirit and scope of the disclosure. Moreover, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. An apparatus for identifying similar electronic messages, wherein the apparatus comprises:
   a memory; and
   a processor coupled to the memory and configured to:
      detect a first electronic message;
      identify one or more words in the first electronic message;
      identify a vector corresponding to each word;
      encode a transition matrix for the first electronic message with vectors corresponding to each word in the first electronic message;
      subtract an average language transition matrix from the encoded transition matrix to form a remaining set of words, wherein the remaining set of words comprises a set of significant words in the first electronic message, and wherein the average language transition matrix comprises common words that are less important in the first electronic message and unable to differentiate the first electronic message from a second electronic message;
      compare the set of significant words in the first electronic message to sets of significant words from a plurality of other electronic messages; and
      present the second electronic message from the plurality of other electronic messages that includes a set of significant words that is similar to the set of significant words in the first electronic message.

2. The apparatus of claim 1, wherein the processor is further configured to translate the set of significant words in the first electronic message into a machine readable format.

3. The apparatus of claim 1, wherein the processor is further configured to:
   compute a cosine distance between the vector representing the set of significant words in the first electronic message and each vector in the plurality of other electronic messages; and
   use the computed cosine distances to identify at least one other electronic message from the plurality of other electronic messages that is similar to the first electronic message.

4. The apparatus of claim 1, wherein the processor is further configured to detect the set of significant words in the first electronic message using a random index system.

5. The apparatus of claim 1, wherein the processor is further configured to:
   encode the result of the subtraction into a vector representation;
   compare the vector representation to a matrix of vector representations, wherein each vector representation in the matrix is associated with an identifier;
   associate an identifier with the vector representation, wherein the identifier associated with the vector representation comprises a new identifier when the vector representation is not similar to an existing vector representation in the matrix, or wherein the identifier associated with the vector representation comprises an identifier of the existing vector representation in the matrix when the vector representation is similar to the existing vector representation in the matrix; and
   identify other electronic messages with a same identifier as the identifier associated with the vector representation, wherein the other electronic messages with the same identifier comprise the similar electronic messages.

6. The apparatus of claim 5, wherein the processor is further configured to determine if the vector representation associated with the vector representation is similar to the existing vector representation in the matrix using a cosine similarity measure.

7. The apparatus of claim 1, wherein the apparatus comprises a user interface (UI), and wherein the processor is further configured to present the first electronic message in a first portion of the UI and the second electronic message in a second portion of the UI.

8. The apparatus of claim 1, wherein the first electronic message comprises an open electronic message of an electronic messaging application.

9. The apparatus of claim 8, wherein the electronic messaging application is an electronic mail application, a chat application, or a social media application.

10. The apparatus of claim 1, wherein the first electronic message is an electronic mail, a chat message, a blog entry, or a social media entry.

11. The apparatus of claim 1, wherein to identify the one or more words in the first electronic message, the processor is further configured to:
detect a word in the first electronic message;
generate a new vector for the detected word when the vector corresponding to the detected word is not identified;
encode a transition matrix for the first electronic message with vectors corresponding to each word in the first electronic message; and
subtract an average language transition matrix from the encoded transition matrix for the first electronic message, wherein a result of the subtraction corresponds to the set of significant words in the first electronic message.

12. A method for identifying similar electronic messages, wherein the method comprises:
detecting a first electronic message;
identifying one or more words in the first electronic message;
identifying a vector corresponding to each word;
encoding a transition matrix for the first electronic message with vectors corresponding to each word in the first electronic message;
subtracting an average language transition matrix from the encoded transition matrix to form a remaining set of words, wherein the remaining set of words comprises a set of significant words in the first electronic message, and wherein the average language transition matrix comprises common words that are less important in the first electronic message and unable to differentiate the first electronic message from a second electronic message;
comparing the set of significant words in the first electronic message to sets of significant words in a plurality of other electronic messages; and
presenting the second electronic message from the plurality of other electronic messages that includes a set of significant words that is similar to the set of significant words in the first electronic message.

13. A non-transitory computer program product including computer program instructions that, when executed by a processor, cause the processor to:

detect a first electronic message;
identify one or more words in the first electronic message;
identify a vector corresponding to each word;
encode a transition matrix for the first electronic message with vectors corresponding to each word in the first electronic message;
subtract an average language transition matrix from the encoded transition matrix to form a remaining set of words, wherein the remaining set of words comprises a set of significant words in the first electronic message, and wherein the average language transition matrix comprises common words that are less important in the first electronic message and unable to differentiate the first electronic message from a second electronic message;
compare the set of one or more significant words in the first electronic message to sets of significant words in a plurality of other electronic messages; and
present at least one second electronic message from the plurality of other electronic messages that includes a set of significant words that is similar to the set of significant words in the first electronic message.

14. The non-transitory computer program product of claim 13, wherein the computer program instructions, when executed by the processor, further cause the processor to translate the set of significant words in the first electronic message into a machine readable format.

15. The non-transitory computer program product of claim 13, wherein the computer program instructions, when executed by the processor, further cause the processor to:
compute a cosine distance between the vector representing the set of significant words in the first electronic message and each vector in the plurality of other electronic messages; and
use the computed cosine distances to identify at least one other electronic message from the plurality of other electronic messages that is similar to the first electronic message.

16. The non-transitory computer program product of claim 13, wherein the computer program instructions, when executed by the processor, cause the processor to detect the set of significant words in the first electronic message using a random index system.

17. The method of claim 12, further comprising:
translating the set of significant words in the first electronic message into a machine readable format.

18. The method of claim 12, further comprising:
computing a cosine distance between the vector representing the set of significant words in the first electronic message and each vector in the plurality of other electronic messages; and
using the computed cosine distances to identify at least one other electronic message from the plurality of other electronic messages that is similar to the first electronic message.

19. The method of claim 12, wherein the first electronic message comprises an open electronic message of an electronic messaging application.

20. The method of claim 19, wherein the electronic messaging application is an electronic mail application, a chat application, or a social media application.

* * * * *